United States Patent [19]
Chea

[11] Patent Number: 6,137,524
[45] Date of Patent: Oct. 24, 2000

[54] TRANSMITTER AND RECEIVER CIRCUITS FOR TRANSMISSION OF VOICE, DATA AND VIDEO SIGNALS FOR EXTENDED DISTANCES

[75] Inventor: Woody Albert Chea, Olathe, Kans.

[73] Assignee: Zekko Corporation, Ponte Vedra Beach, Fla.

[21] Appl. No.: 08/550,359

[22] Filed: Oct. 30, 1995

[51] Int. Cl.⁷ ............................. H04N 7/10; H04N 7/14
[52] U.S. Cl. ................... 348/6; 348/17; 455/3.1
[58] Field of Search ............... 348/6, 7, 8, 12, 348/13, 14, 15, 17, 438; 455/3.1, 5.1, 6.3; 379/90.01, 93.08, 93.17, 93.26, 110.01; H04N 7/10, 7/14

[56] References Cited

U.S. PATENT DOCUMENTS

| | | | |
|---|---|---|---|
| 3,872,253 | 3/1975 | Jurschak | 179/5 R |
| 4,030,027 | 6/1977 | Yamada et al. | 324/34 |
| 4,054,910 | 10/1977 | Chou et al. | 358/86 |
| 4,525,677 | 6/1985 | Rorden | 330/258 |
| 4,679,209 | 7/1987 | Hogeboom et al. | |
| 4,714,959 | 12/1987 | Pshtissky | |
| 4,980,887 | 12/1990 | Dively et al. | |
| 4,995,031 | 2/1991 | Aly et al. | |
| 5,130,793 | 7/1992 | Bordry et al. | |
| 5,187,446 | 2/1993 | Daly | 330/10 |
| 5,283,637 | 2/1994 | Goolcharan | |
| 5,283,789 | 2/1994 | Gunnarsson et al. | |
| 5,347,305 | 9/1994 | Bush et al. | |
| 5,367,273 | 11/1994 | Georger et al. | |
| 5,387,927 | 2/1995 | Look et al. | |
| 5,408,260 | 4/1995 | Arnon | |
| 5,485,488 | 1/1996 | Van Brunt et al. | 375/257 |
| 5,523,703 | 6/1996 | Yamamoto et al. | 326/30 |
| 5,528,286 | 6/1996 | Goolcharan | 348/17 |
| 5,537,142 | 7/1996 | Fenuouil | 348/12 |
| 5,541,957 | 7/1996 | Lau | 375/258 |
| 5,592,510 | 1/1997 | Van Brunt et al. | 348/220 |
| 5,608,464 | 3/1997 | Woodham | 348/578 |

FOREIGN PATENT DOCUMENTS

WO9511570  4/1995  WIPO.

*Primary Examiner*—Tommy P. Chin
*Assistant Examiner*—Nhon T Diep
*Attorney, Agent, or Firm*—Wm. Bruce Day

[57] ABSTRACT

A communication system allows the transmission of voice, data, and non-compressed video signals over shielded or unshielded copper wire for extended distances. The system includes a transmitter, a wire link, and a receiver. The transmitter in the preferred embodiment amplifies substantially the entire frequency spectrum of the signal, converts the signal from common mode to differential mode, and adds a current to drive the signal over the wire link for extended distances. The receiver in the preferred embodiment provides an offset impedance and an offset capacitance to the signal to compensate for the impedance and capacitance of the wire link, amplifies the signal, converts the signal from differential mode to common mode, suppresses the noise in the signal, removes the current from the signal, and amplifies and refines the signal using sin x/x correction.

13 Claims, 10 Drawing Sheets

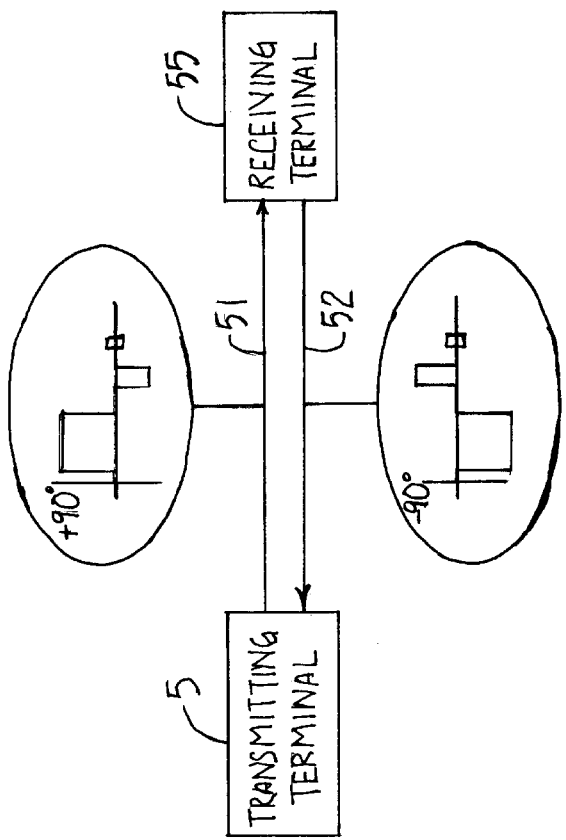
Fig. 12
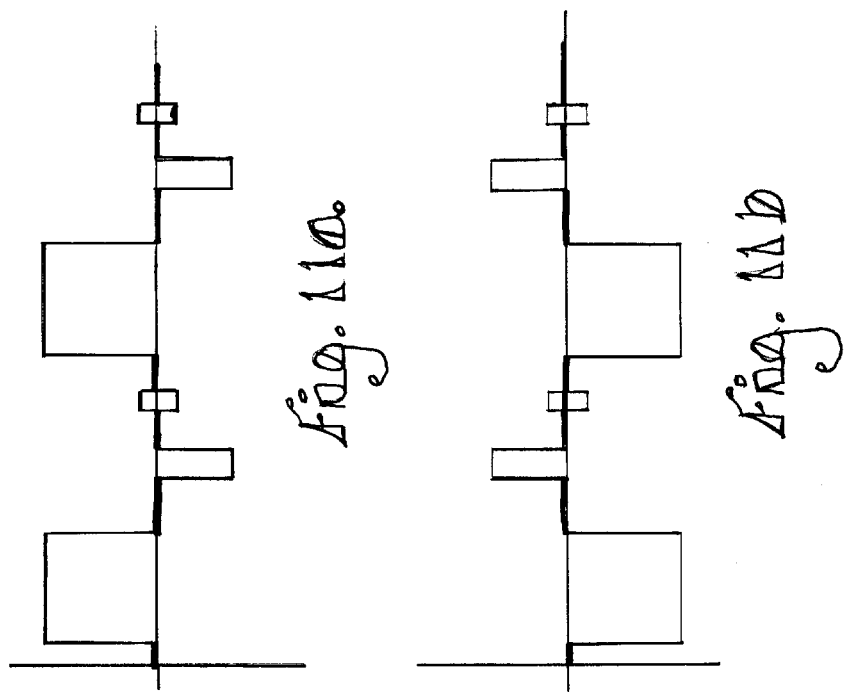
Fig. 11a
Fig. 11b

TRANSMITTER AND RECEIVER CIRCUITS FOR TRANSMISSION OF VOICE, DATA AND VIDEO SIGNALS FOR EXTENDED DISTANCES

FIELD OF THE INVENTION

This invention relates to a communication system for transmitting voice, data, and video signals over conventional telephone twisted pair for extended distances without compression or loss of image.

BACKGROUND OF THE INVENTION

To provide telephone service throughout the country, an infrastructure of telephone lines has been established connecting telephone central offices to homes and businesses. Such telephone lines consist of twisted pairs of insulated copper wires of 19, 22, 24 and 26 gauge (AWG).

A twisted pair of copper wire possesses an impedance and a capacitance which increases with the length of the line. A signal transmitted over a telephone line is attenuated due to this impedance and capacitance. Therefore, the longer the transmission distance, the greater the signal degradation.

This infrastructure is suitable for the transmission of voice and data signals, which require a bandwidth of about 4 kilohertz, because the attenuation in a voice or data signal can be reduced by periodically inserting series inductance on the line, a practice termed loading. Therefore, voice and data signals can be transmitted between telephone handsets, computers, and facsimile machines for hundreds of thousands of feet on twisted pair.

Conventional telephone wire is unsatisfactory, however, for the transmission of video signals, which require a bandwidth of at least 4.2 megahertz, because of the degradation a video signal experiences in passing over a copper wire, particularly the portions of the video signal near the upper and lower ends of the frequency spectrum. Therefore, video signals can only be transmitted about 500 feet over twisted pair before loss of image.

Compression technology solves the distance problem associated with transmitting video signals over twisted pair. When a video signal is compressed, it can be transmitted for extended distances over a conventional telephone line; however, the video signal also loses clarity due to the image loss caused by the compression scheme. Therefore, compression has not proven itself as a viable alternative for applications requiring low image loss, such as in the delivery of television programming.

The transmission of video signals without image loss has heretofore required broadband transmission facilities, such as conventional coaxial cable and fiber optic cable, which are capable of moving large volumes of information for extended distances.

Conventional coaxial cable has been extensively used by the cable television industry in providing large amounts of television programming to homes throughout the country. While suitable for the one-way transmission of video signals, conventional coaxial cable is unsuitable for applications requiring two-way transmission, such as the provision of telephone service, home shopping, and movies on demand.

Because of its bi-directional capabilities, fiber optic cable is currently the facility of choice for the transmission of video, telephone service, and other interactive fare. However, while long distance companies have established extensive fiber optic networks throughout the country, most local exchange carriers have not replaced existing copper facilities with fiber because of the high cost of installation. For example, over 90% of the Bell companies' 2.7 million miles of telephone lines are conventional twisted pair. Therefore, because of the existing copper infrastructure already in place and the prohibitive cost of installing fiber optic lines, the provision of both interactive video and telephone service over the same facility has heretofore been limited to a small percentage of homes and businesses which have been connected to a central office with new installations of fiber optic cable.

BRIEF SUMMARY OF THE INVENTION

A primary object of the present invention is to provide a communication system employing conventional telephone lines for use in transmitting telephone signals, data signals, and full motion video signals without compression or loss of image. By providing a system for transmitting video signals over existing copper infrastructure, the invention dispenses with the need for fiber optic lines to be installed into every home or business.

The present invention is a communication system for transmitting a non-compressed video signal without loss of image for extended distances comprising a transmitter, a wire pair link, and a receiver.

The transmitter of the present invention amplifies substantially the entire frequency spectrum of the video signal, without losing information at the low and high ends. It then converts the video signal from common mode to differential mode having a non-inverted component and an inverted component. The transmitter then adds a 90 degree current to the non-inverted component of the differential signal, and a −90 degree current to the inverted component of the differential signal.

By using current to drive the differential signal, video can be transmitted over shielded or unshielded twisted pair copper wire up to 5000 feet. The transmission distance can be increased to 15,000 feet by increasing the current. In addition, because the 90 degree current and −90 degree current cancel each other out, crosstalk is almost eliminated. The twisted pair will exert a known impedance and capacitance on the differential signal transmitted over the line.

The receiver of the present invention imposes a corresponding, opposite impedance and capacitance on the differential signal, thereby reversing the effects of the line impedance and capacitance on the video signal. It then strips the −90 degree current from the inverted component of the differential signal and converts the video signal from differential mode to common mode. The receiver then suppresses the noise in the video signal, and strips the 90 degree current from the video signal. The receiver then uses sin x/x correction to amplify and refine the video signal. As a consequence, the video signal is accurately reconstructed to its original form that it had at the transmitting end of the twisted pair link.

To take further advantage of the communication system of the present invention, a plurality of voice band signals and video signals in addition to the video signal described above are transmitted over the twisted pair. At the transmitting end, a plurality of telephone signals, data signals, and video signals are multiplexed together to form a composite signal. At the receiving end, the composite signal is separated and demultiplexed into the corresponding signals. Therefore, various combinations of video, voice, and data signals can be transmitted over a single conventional twisted pair link.

To take further advantage of the communication system of the present invention, each end of the communications link has a transmitting end and a receiving end to allow for bi-directional communication. Therefore, the present invention can be used for the provision of interactive services requiring two-way transmission, such as distance learning, video teleconferencing, medical imaging, movies on demand, home shopping, and video telephony. In addition, although the present invention has been described for use in connection with a telephone central office, it is equally applicable for applications in which the two ends of the wire pair link are located on the same floor, in the same building, or in the same complex of buildings, such as in a company, university, hospital, or military base.

The invention may be described with greater clarity and particularity with reference to the accompanying drawings.

The drawings constitute a part of this specification and include an exemplary embodiment of the present invention and illustrate various objects and features thereof.

DESCRIPTION OF THE DRAWINGS

FIG. 11a illustrates the non-inverted component of a video signal in differential mode.

FIG. 11b illustrates the inverted component of a video signal in differential mode.

FIG. 12 illustrates a current driven video signal in differential mode transmitted over a wire pair link.

DETAILED DESCRIPTION OF THE INVENTION

Figure 1:
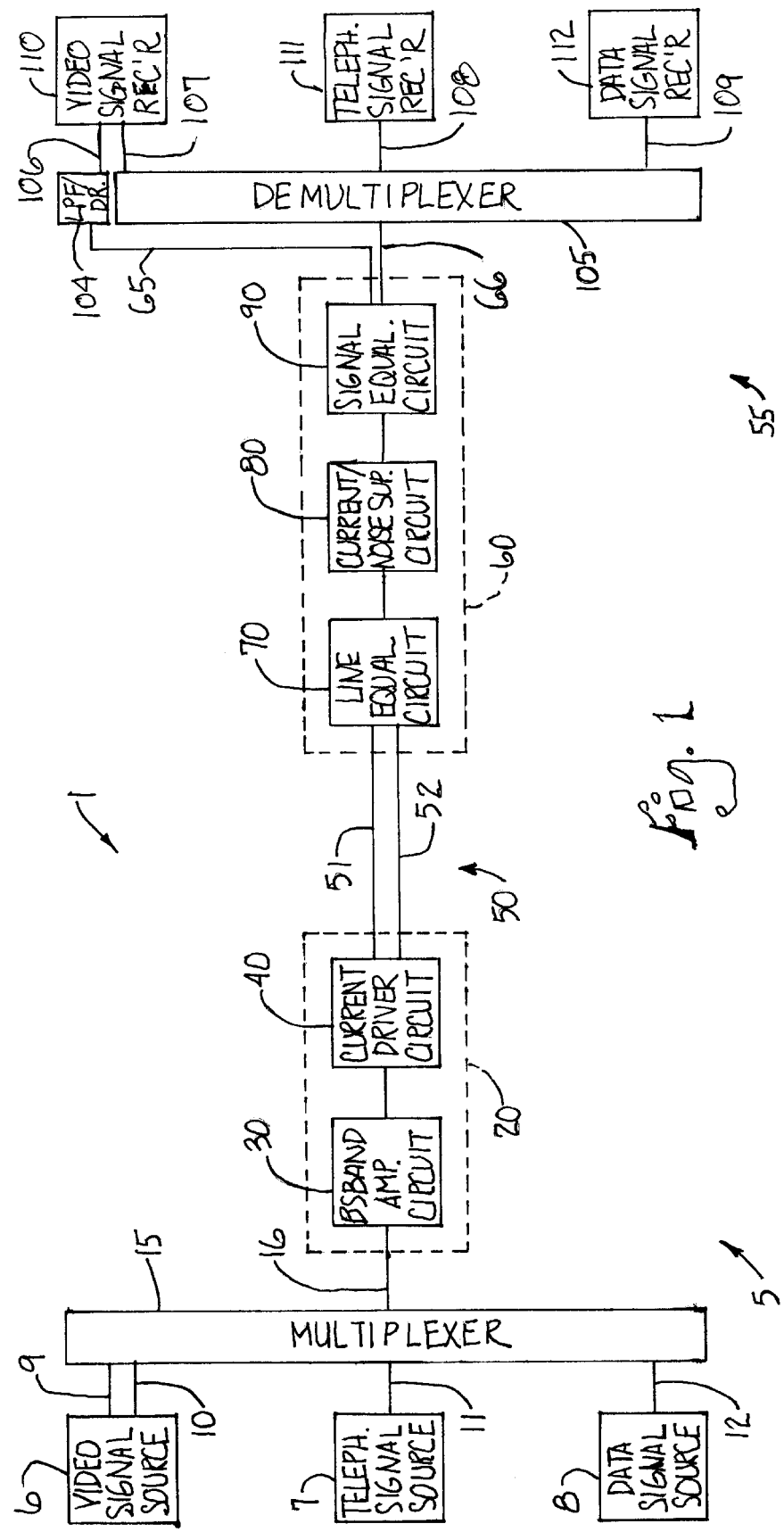
FIG. 1 is a block diagram of a communication system constructed according to the invention.

As required, details of the present invention are disclosed herein; however, it is to be understood that the disclosed embodiments are merely exemplary of the invention which may be embodied in various forms. Therefore, specific circuitry and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

FIG. 1 illustrates a communication system 1 comprised of a transmitting terminal 5 and a receiving terminal 55 connected by a wire pair link 50.

At the transmitting terminal 5, a video signal source 6, a telephone signal source 7, and a data signal source 8 are coupled to a multiplexer circuit 15. The multiplexer circuit 15 is coupled to a transmitter 20 having a baseband amplification circuit 30 and a current driver circuit 40. The transmitter 20 is coupled to the first end of the wire pair link 50.

At the receiving terminal 55, the second end of the wire pair link 50 is coupled to a receiver 60 having a line equalization circuit 70, a current/noise suppression circuit 80, and a signal equalization circuit 90. The receiver 60 is coupled to a demultiplexer circuit 105 and a lowpass filter/ driver circuit 104. The demultiplexer circuit 105 is coupled to a video signal receiver 110, a telephone signal receiver 111, and a data signal receiver 112, and the lowpass filter/ driver circuit 104 is coupled to the video signal receiver 110.

Signal Sources

The signal sources of the transmitting terminal 5 are illustrated in FIG. 1. The signal sources include a video signal source 6, such as a video camera, a telephone signal source 7, such as a telephone handset, and a data signal source 8, such as a modem. Although only one video signal source 6, one telephone signal source 7, and one data signal source 8 are depicted, the communication system 1 is capable of handling a plurality of video and voice band signal sources.

The video signal source 6 produces a signal with an audio component 9 and a video component 10, which has a bandwidth of at least 4.2 megahertz, and preferably 6.0 megahertz. The telephone signal source 7 produces a telephone signal 11 with a bandwidth of 4 kilohertz. The data signal source 8 produces a data signal 12 with a bandwidth of 4 kilohertz. These signals are coupled to the multiplexer circuit 15.

Multiplexer Circuit

The multiplexer circuit 15 multiplexes the audio component 9 and the video component 10 of the video signal, the telephone signal 11, and the data signal 12 to form a composite signal 16. Any multiplexer made by a variety of manufacturers may be used. The composite signal output 16 of the multiplexer circuit 15 is coupled to the transmitter 20.

Transmitter

Figure 2:
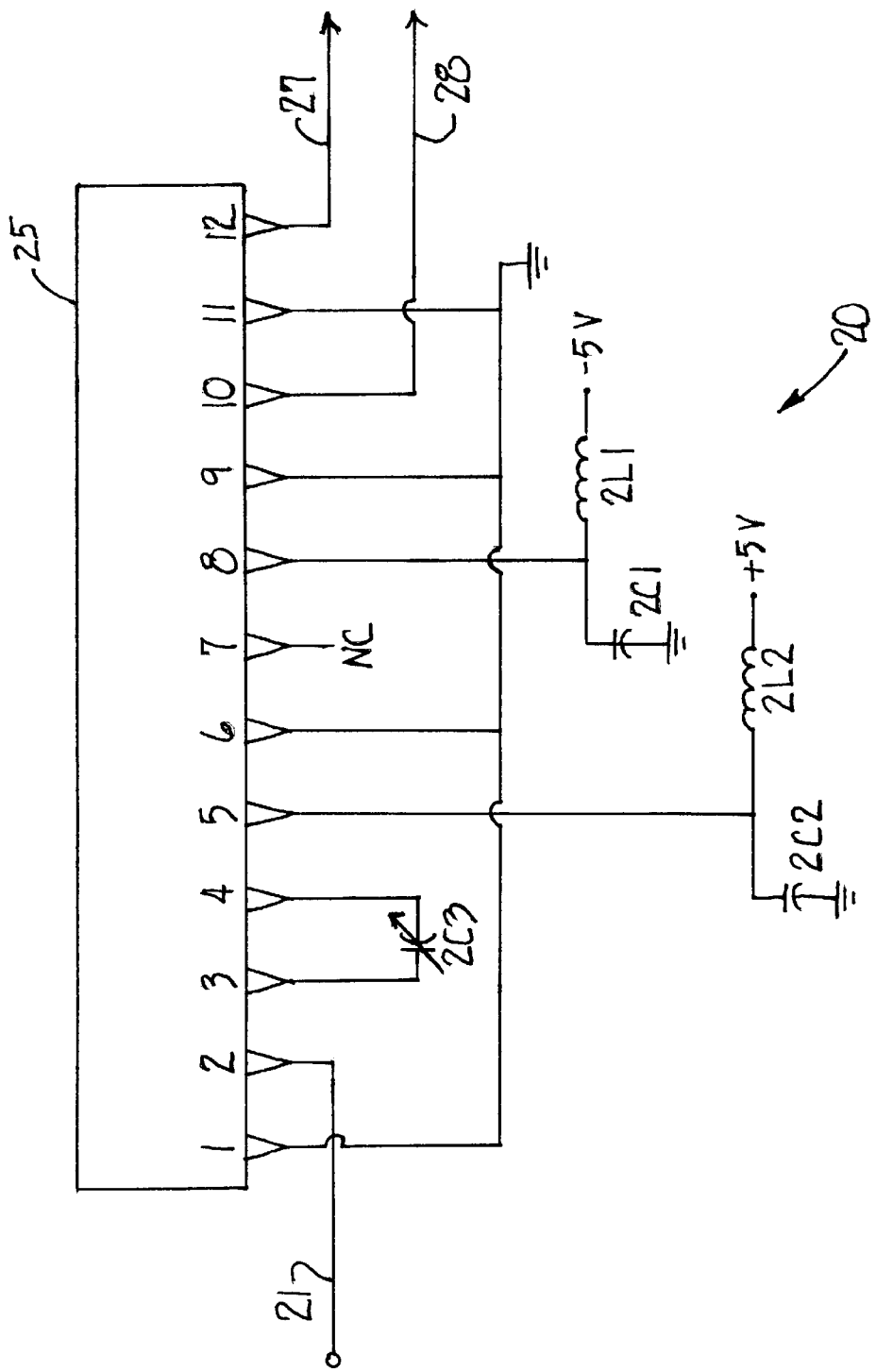
FIG. 2 is a schematic diagram of a transmitter of the communication system of FIG. 1.

The transmitter 20 is illustrated schematically in FIG. 2. The composite signal output 16 of the multiplexer circuit 15 is coupled to an input line 21 of the transmitter 20. The transmitter 20 is comprised of a transmitter chip 25, external capacitors 2C1 and 2C2, an external variable capacitor 2C3, and external inductors 2L1 and 2L2. The transmitter chip 25 is comprised of a baseband amplification circuit 30 illustrated schematically in FIG. 3 and a current driver circuit 40 illustrated schematically in FIG. 4.

As illustrated in FIG. 2, the transmitter chip 25 is powered by a +5 volt DC power supply and a −5 volt DC power supply. The +5 volt DC power supply is connected to the external capacitor 2C2 and the external inductor 2L2, and the −5 volt DC power supply is connected to the external capacitor 2C1 and the external inductor 2L1. The values of 2C1, 2L1, 2C2, and 2L2 are dependent on the DC power supply used and on the application. If a clean DC power supply is used, capacitors 2C1 and 2C2 and inductors 2L1 and 2L2 are not needed.

The input line 21 of the transmitter 20 is connected to the baseband amplification circuit 30.

Baseband Amplification Circuit

Figure 3:
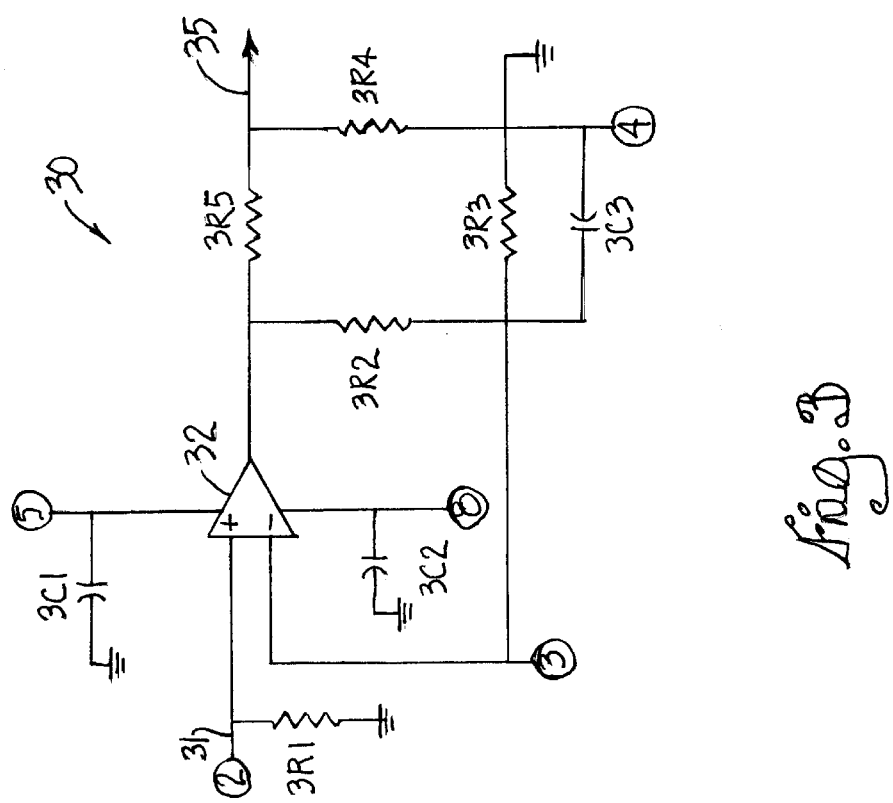
FIG. 3 is a schematic diagram of a baseband amplification circuit employed in the transmitter of FIG. 2.

The baseband amplification circuit 30 is illustrated schematically in FIG. 3. The input line 21 of the transmitter 20 is connected to an input line 31 of the baseband amplification circuit 30.

The baseband amplification circuit 30 employs an operational amplifier 32, such as model AD811 by Analog Device, resistors 3R1, 3R2, 3R3, 3R4, and 3R5 having values of 75 ohms, 750 ohms, 750 ohms, 195 ohms, and 75 ohms respectively, and capacitors 3C1, 3C2, and 3C3 having values of 0.1 microfarads, 0.1 microfarads, and 100 picofarads respectively.

The operational amplifier 32, resistor 3R3, and capacitor 3C3 are used to amplify substantially the entire frequency spectrum of the composite signal, including the low and high frequencies.

The baseband amplification circuit 30 also employs an external variable capacitor 2C3 (FIG. 2). Capacitor 2C3 is used to refine the high frequencies of the composite signal. The value of 2C3 will vary from 4 picofarads to 24 picofarads, depending on the frequency bandwidth of the composite signal.

The output line 35 of the baseband amplification circuit 30 is connected to the current driver circuit 40.

Current Driver Circuit

Figure 4:
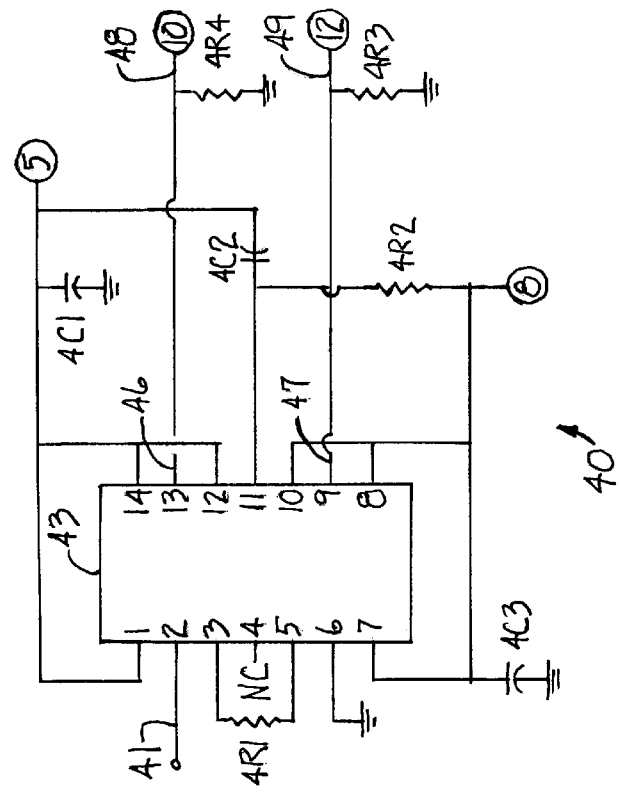
FIG. 4 is a schematic diagram of a current driver circuit employed in the transmitter of FIG. 2.

The current driver circuit 40 is illustrated schematically in FIG. 4. The output line 35 of the baseband amplification circuit 30 is connected to an input line 41 of the current driver circuit 40.

The current driver circuit 40 employs a model Max 435 non-feedback transconducting amplifier by Maxim 43, resistors 4R1, 4R2, 4R3, and 4R4 having values of 495 ohms, 4.7K ohms, 34.8 ohms, and 34.8 ohms respectively, and capacitors 4C1, 4C2, and 4C3 having values 0.22 microfarads, 0.22 microfarads, and 0.22 microfarads respectively. It should be noted that if a different model non-feedback transconducting amplifier is used, the circuit configuration will change.

The non-feedback transconducting amplifier 43 is used to convert the composite signal from common mode to differential mode. The differential composite signal has a non-inverted component and an inverted component.

FIGS. 11a and 11b illustrate a signal in differential mode. The non-inverted component of a differential video signal is illustrated in FIG. 11a, and the inverted component of a differential video signal is illustrated in FIG. 11b.

The non-feedback transconducting amplifier 43 then adds a 90 degree current to the non-inverted component of the differential composite signal and a −90 degree current to the inverted component of the differential composite signal. Resistor 4R2 and capacitor 4C2 are used to set and reset the time constant of the current.

The non-inverted component of the differential composite signal driven by the 90 degree current appears on line 46.

The inverted component of the differential composite signal driven by the −90 degree current appears on line 47.

Resistors 4R3 and 4R4 are used to match the resistance of the wire pair link 50. Because the resistance of a wire is constant, independent of the length of the wire, the values of 4R3 and 4R4 will not vary with the length of the wire pair link 50.

Output lines 48 and 49 of the current driver circuit 40 are connected to output lines 27 and 28 of the transmitter 20.

Output lines 27 and 28 of the transmitter 20 are coupled to the first end of the wire pair link 50.

Wire Pair Link

The wire pair link 50 is illustrated in FIG. 1. Output lines 27 and 28 of the transmitter 20 of the transmitting terminal 5 are coupled to the first end of the wire pair link 50.

The wire pair link 50 is comprised of a first wire 51 and a second wire 52. As illustrated in FIG. 12, the first wire 51 carries the non-inverted component of the differential composite signal driven by the 90 degree current. The second wire carries the inverted component of the differential composite signal driven by the −90 degree current. The 90 degree current on the first wire 51 and the −90 degree current on the second wire 52 cancel each other with a phase shift error of $10^{-24}$. Therefore, crosstalk is almost completely eliminated.

The wire pair link 50 has a known impedance and capacitance which is dependent on the type and length of the wire used. The first wire 51 and the second wire 52 of the wire pair link 50 will typically be conventional telephone twisted pair; however, any copper wire may be used, including untwisted, shielded, or unshielded wire. The transmitter 20 is capable of driving the differential composite signal up to a distance of 5000 feet. The transmission distance can be extended to 15,000 feet by adding additional circuits to increase the current driving the signal.

Figure 13D:
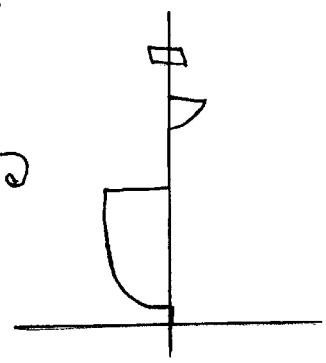
FIG. 13d illustrates a video signal at the output of the current/noise suppression circuit of FIG. 7.
Figure 13C:
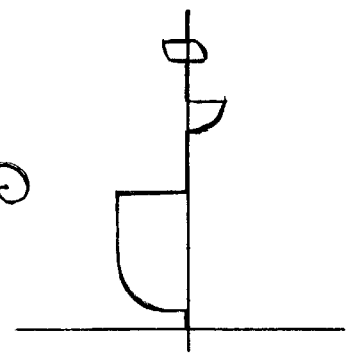
FIG. 13c illustrates a video signal at the output of the line equalization circuit of FIG. 6.
Figure 13E:
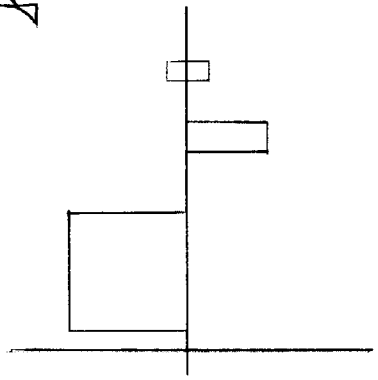
FIG. 13e illustrates a video signal at the output of the signal equalization circuit of FIG. 8.
Figure 13A:
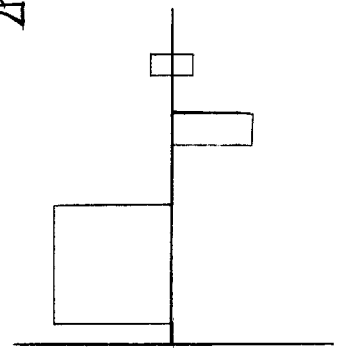
FIG. 13a illustrates a video signal at the input to the transmitter of FIG. 2.
Figure 13B:
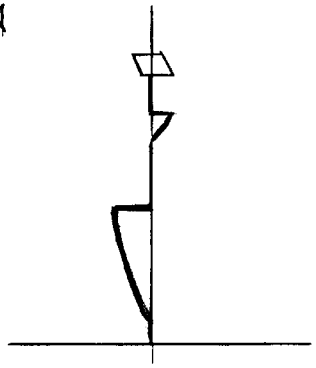
FIG. 13b illustrates a video signal at the input to the receiver of FIG. 5.

FIGS. 13a and 13b illustrate the effect that the wire pair link 50 has on the signal. FIG. 13a illustrates a video signal at the transmitter 20. As the video signal is transmitted over the wire pair link 50, it is degraded due to the impedance and capacitance of the line. The degraded video signal is illustrated in FIG. 13b. As shown, the video signal has lost linearity and amplitude.

The second end of the wire pair link 50 is coupled to the receiver 60 of the receiving terminal 55.

Receiver

Figure 5:
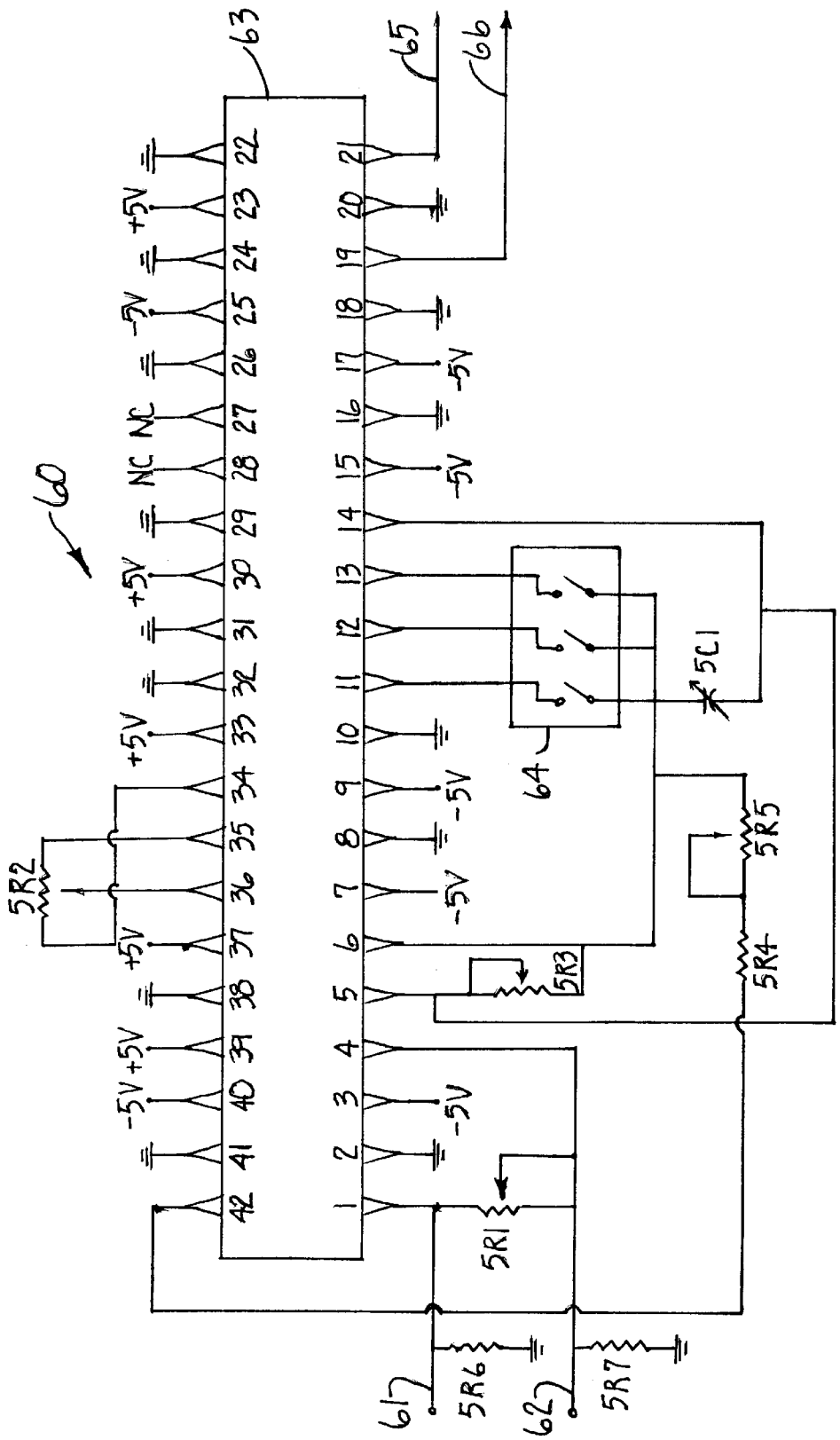
FIG. 5 is a schematic diagram of a receiver of the communication system of FIG. 1.

The receiver 60 is illustrated schematically in FIG. 5. The second end of the wire pair link 50 is coupled to input lines 61 and 62 of the receiver 60.

The receiver 60 is comprised of a receiver chip 63, external variable resistors 5R1, 5R2, 5R3, and 5R5, external resistors 5R4, 5R6, and 5R7, an external variable capacitor 5C1, and a dip switch 64. The receiver chip 63 is comprised of a line equalization circuit illustrated schematically in FIG. 6, a current/noise suppression circuit illustrated schematically in FIG. 7, and a signal equalization circuit illustrated schematically in FIG. 8. As illustrated in FIG. 5, the receiver chip 63 is powered by a +5 volt DC power supply and a −5 volt DC power supply.

The input lines 61 and 62 of the receiver 60 are connected to the line equalization circuit 70.

Line Equalization Circuit

Figure 6:
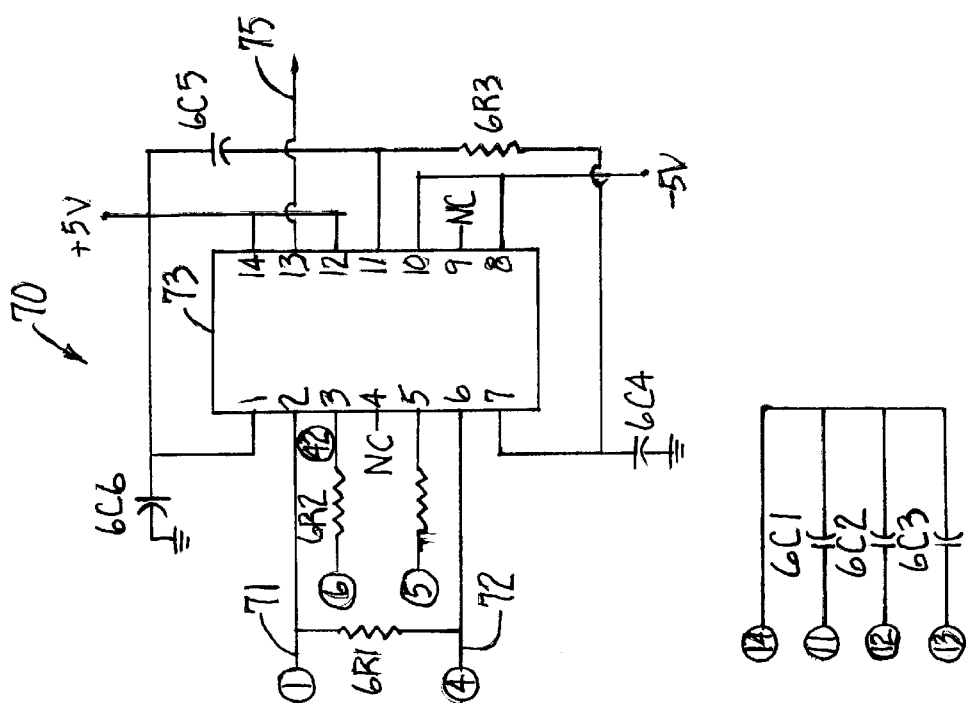
FIG. 6 is a schematic diagram of a line equalization circuit employed in the receiver of FIG. 5.

The line equalization circuit 70 is illustrated schematically in FIG. 6. The input lines 61 and 62 of the receiver 60 are connected to input lines 71 and 72 of the line equalization circuit 70.

The line equalization circuit employs a model Max 436 non-feedback transconducting amplifier by Maxim 73, resistors 6R1, 6R2, and 6R3 having values of 60 ohms, 100 ohms, and 4.7K ohms respectively, capacitors 6C1, 6C2, 6C3, 6C4, 6C5, and 6C6 having values of 1000 picofarads, 1000 picofarads, 1000 picofarads, 0.1 microfarads, 0.22 microfarads, and 0.22 microfarads respectively, external resistors 5R4, 5R6, and 5R7 (FIG. 5) having a values of 0.1 ohms, 120 ohms, and 120 ohms respectively, external variable resistors 5R1, 5R3, and 5R5 (FIG. 5), an external variable capacitor 5C1 (FIG. 5), and a dip switch (FIG. 5). It should be noted that if a different model non-feedback transconducting amplifier is used, the circuit configuration will change.

Resistors 5R6 and 5R7 almost completely eliminate the small amount of crosstalk from the wire pair link 50.

Resistor 6R1 provides an offset impedance to the differential composite signal to correct for the degradation caused by the impedance of the wire pair link 50. Variable resistor 5R1 attenuates the differential composite signal to compensate for the gain from the transmitter 20. The value of 5R1 will vary from 1K ohms to 2K ohms, depending on the type and length of the wire used in the wire pair link 50.

Resistor 6R2 and variable resistor 5R3 adjust the linearity of the differential composite signal, and resistor 5R4 and variable resistor 5R5 adjust the linearity of the high frequencies. The value of 5R3 will vary from 0 ohms to 1K ohms, and the value of 5R5 will vary from 0 ohms to 500 ohms, depending on the type and length of the wire used in the wire pair link 50.

Capacitors 6C1, 6C2, and 6C3 and variable capacitor 5C1 provide an offset capacitance to the differential composite signal to correct for the degradation caused by the capacitance of the wire pair link 50. The value of 5C1 will vary from 10 picofarads to 180 picofarads, depending on the type and length of the wire used in the wire pair link 50. The positions of each of the three switches in the dip switch 64 will also vary depending on the type and length of the wire used in the wire pair link 50.

The non-feedback transconducting amplifier 73 is used to convert the composite signal from differential mode to common mode and to strip the −90 degree current from the composite signal.

FIGS. 13b and 13c illustrate the effect that the line equalization circuit 70 has on a signal. The degraded video signal appearing at the input to the receiver 60 is illustrated in FIG. 13b. The line equalization circuit 70 amplifies the signal and corrects some of the loss of linearity The partially reconstructed video signal appearing at the output of the line equalization circuit 70 is illustrated in FIG. 13c.

The output line 75 of the line equalization circuit 70 is connected to the current/noise suppression circuit 80.

Current/Noise Suppression Circuit

Figure 7:
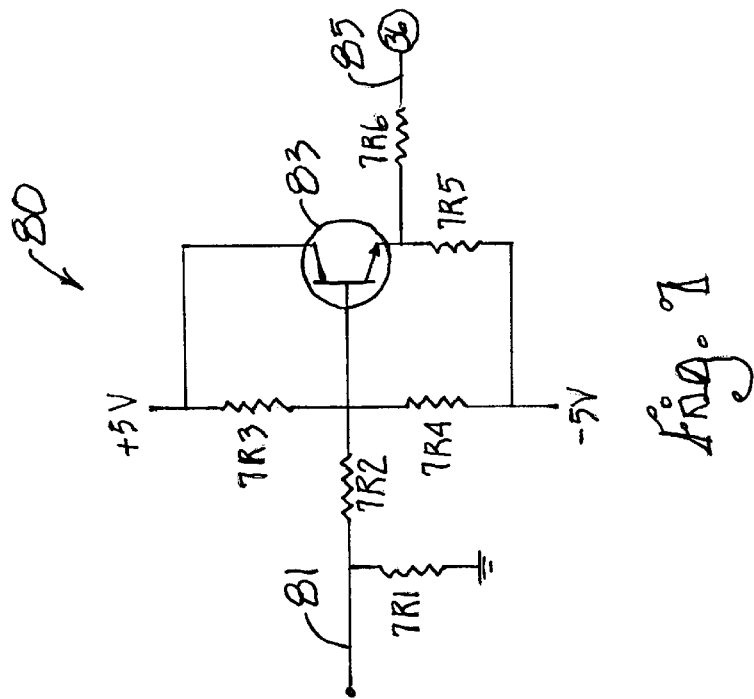
FIG. 7 is a schematic diagram of a current/noise suppression circuit employed in the receiver of FIG. 5.

The current/noise suppression circuit 80 is illustrated schematically in FIG. 7. The output line 75 of the line equalization circuit 70 is connected to an input line 81 of the current/noise suppression circuit 80.

The current/noise suppression circuit 80 employs a transistor 83, such as model MMBT 4124 by National, and resistors 7R1, 7R2, 7R3, 7R4, 7R5, and 7R6 having values of 169 ohms, 75 ohms, 27K ohms, 39K ohms, 1K ohms, and 139 ohms respectively.

Resistors 7R1, 7R2, and 7R6 strip the 90 degree current from the composite signal. Resistors 7R1 and 7R2 suppress the noise in the composite signal. Resistors 7R3 and 7R4 bias the transistor 83, as well as suppress noise. Resistor 7R6 adjusts the gain of the composite signal.

FIGS. 13c and 13d illustrate the effect that the current/noise suppression circuit 80 has on a signal. The partially reconstructed video signal appearing at the input to the current/noise suppression circuit 80 is illustrated in FIG. 13c. The current/noise suppression circuit 80 suppresses the noise in the video signal. The video signal appearing at the output of the current/noise suppression circuit 80 is illustrated in FIG. 13d.

The output line 85 of the current/noise suppression circuit 80 is connected to the signal equalization circuit 90 through an external variable resistor 5R2.

Signal Equalization Circuit

Figure 8:
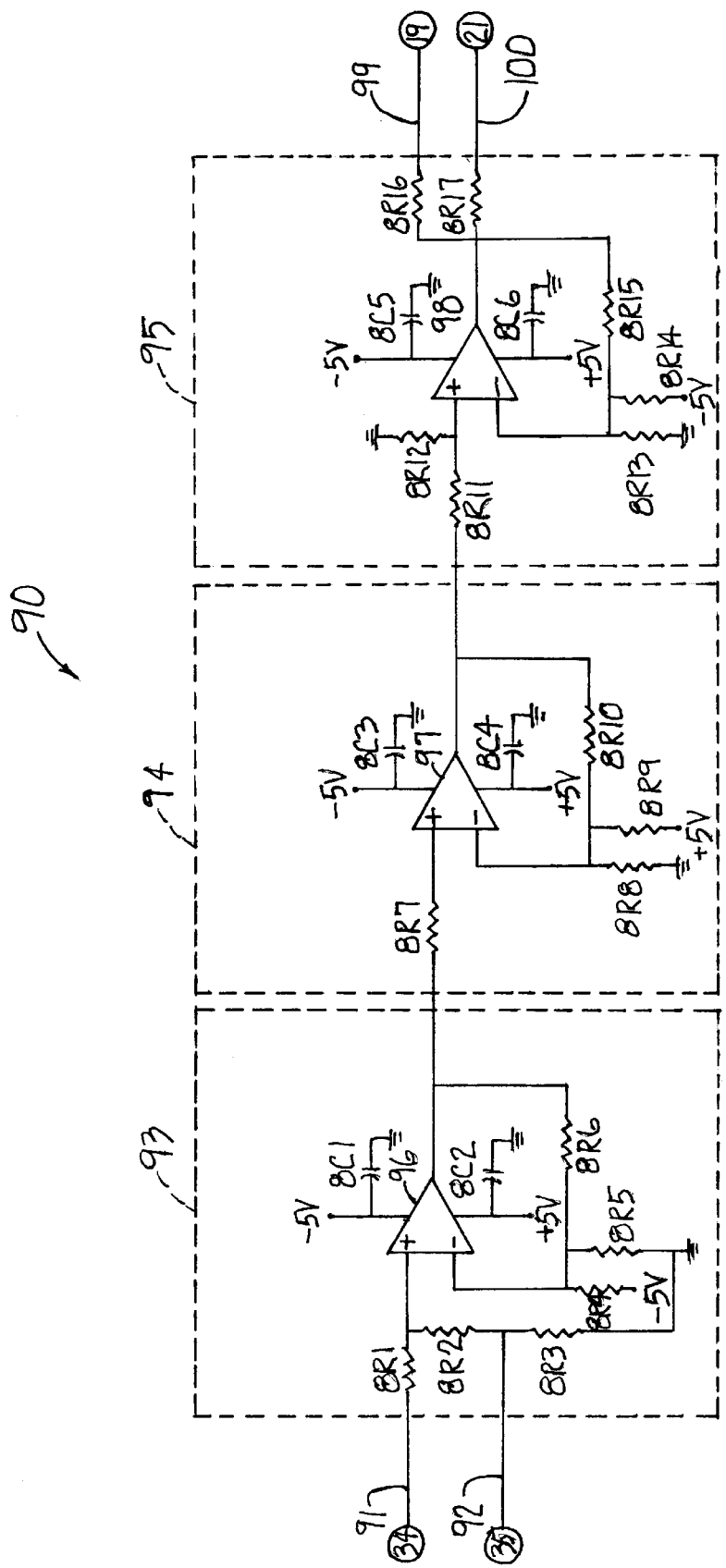
FIG. 8 is a schematic diagram of a signal equalization circuit employed in the receiver of FIG. 5.

The signal equalization circuit 90 is illustrated schematically in FIG. 8. The output line 85 of the current/noise suppression circuit 80 is connected to input lines 91 and 92 of the signal equalization circuit 90 through an external variable resistor 5R2 (FIG. 5). Variable resistor 5R2 is used to adjust the gain of the composite signal. The value of 5R2 will vary from 0 ohms to 1K ohms, depending on the type and length of the wire used in the wire pair link 50.

The signal equalization circuit 90 has three stages: stage one 93, stage two 94, and stage three 95, which use sin x/x correction to amplify and refine the composite signal. As used herein, sin x/x correction means that the negative component and the positive component of the composite signal are alternately amplified and refined to balance the signal. In stage one 93, the negative component of the composite signal is refined and amplified to approximately 98% of its original amplitude, which causes the positive component to lose approximately 20% of its amplitude. In stage two 94, the positive component of the composite signal is refined and amplified to approximately 100% of its original amplitude, which causes the negative component to lose approximately 5–10% of its amplitude. In stage three 95, the negative component is refined and amplified to approximately 100% of its original amplitude. At the output of the signal equalization circuit 90, both the positive and negative components of the composite signal have been equalized.

FIGS. 13d and 13e illustrate the effect that sin x/x correction has on a signal. FIG. 13d illustrates a video signal appearing at the input to the signal equalization circuit 90. Using sin x/x correction, the positive and negative components of the video signal are amplified and refined. The reconstructed video signal appearing at the output of the signal equalization circuit 90 is illustrated in FIG. 13e. Therefore, at the output of the signal equalization circuit 90, the video signal is almost completely restored.

Stage one 93 of the signal equalization circuit 90 employs an operational amplifier 96, such as model AD811 by Analog Device, resistors 8R1, 8R2, 8R3, 8R4, 8R5, and 8R6 having values of 100 ohms, 2.7K ohms, 10 ohms, 24K ohms, 750 ohms, and 750 ohms respectively, and capacitors 8C1 and 8C2 having values of 0.1 microfarads and 0.1 microfarads respectively.

Stage two 94 of the signal equalization circuit 90 employs an operational amplifier 97, such as model AD811 by Analog Device, resistors 8R7, 8R8, 8R9, and 8R10 having values of 75 ohms, 750 ohms, 14.5K ohms, and 750 ohms respectively, and capacitors 8C3 and 8C4 having values of 0.1 microfarads and 0.1 microfarads respectively.

Stage three 95 of the signal equalization circuit 90 employs an operational amplifier 98, such as model AD811 by Analog Device, resistors 8R11, 8R12, 8R13, 8R14, 8R15, 8R16, and 8R17 having values of 75 ohms, 175 ohms, 1.2K ohms, 2K ohms, 1.75K ohms, 75 ohms, and 75 ohms respectively, and capacitors 8C5 and 8C6 having values of 0.1 microfarads and 0.1 microfarads respectively.

The composite signal appears at each of output lines 99 and 100 of the signal equalization circuit 90. This composite signal has less than 1% error compared to the composite signal output 16 of the multiplexer circuit 15 (FIG. 1). Therefore, although additional stages may be used to further amplify and refine the composite signal, they are not required.

The composite signal on output line 99 is connected to output line 65 of the receiver 60, which is coupled to the lowpass filter/driver circuit 104. The composite signal on output line 100 is connected to output line 66 of the receiver 60, which is coupled to the demultiplexer circuit 105.

Lowpass Filter/Driver Circuit

The composite signal appearing on output line 65 of the receiver 60 is coupled to the lowpass filter/driver circuit 104. The lowpass filter/driver circuit 104 removes the video component 106 of the video signal from the composite signal, maintaining the signal to noise ratio of the video component 106. Any lowpass filter and driver made by a variety of manufacturers may be used. The video component 106 of the video signal is coupled to the video signal receiver 110.

Demultiplexer Circuit

The composite signal appearing on output line 66 of the receiver 60 is coupled to the demultiplexer circuit 105. The demultiplexer circuit 105 demultiplexes the composite signal into the telephone signal 108, the data signal 109, and the audio component 107 of the video signal. Any demultiplexer made by a variety of manufacturers may be used. These signals are coupled to corresponding signal receivers.

Signal Receivers

The signal receivers are illustrated in FIG. 1. The video component 106 and the audio component 107 of the video signal are coupled to a video signal receiver 110, such as a television set. The telephone signal 108 is coupled to a telephone signal receiver 111, such as a telephone handset. The data signal 109 is coupled to a data signal receiver 112, such as a data modem receiving module.

In the communication system of FIG. 1, the transmitter 20 is capable of transmitting a composite signal with a bandwidth of up to 350 megahertz over the wire pair link 50 to the receiver 60. The communication system's bandwidth capability is dependent on the length of the wire pair link 50. For example, a 350 megahertz composite signal can be transmitted up to 1000 feet, a 12 megahertz composite signal up to 3500 feet, and an 8 megahertz composite signal up to 5000 feet.

Also, the communication system of FIG. 1 includes a current/noise suppression circuit 80 which strips the current from the composite signal. Certain applications, however, will not require the current to be stripped from the signal, such as driving an LED. The communication system of FIG. 1 also includes a line equalization circuit 70 which converts the composite signal from differential mode to common mode. Certain applications, however, will require that the composite signal remain in differential mode.

Also, the communication system of FIG. 1 illustrates a transmitting terminal 5 on one end of the communication system 1 and a receiving terminal 55 on the other end of the communication system 1. It is to be understood, however, that in most applications each end of the communication system 1 will have both a transmitting terminal 5 and a receiving terminal 55 to allow for bi-directional communication.

Figure 9:
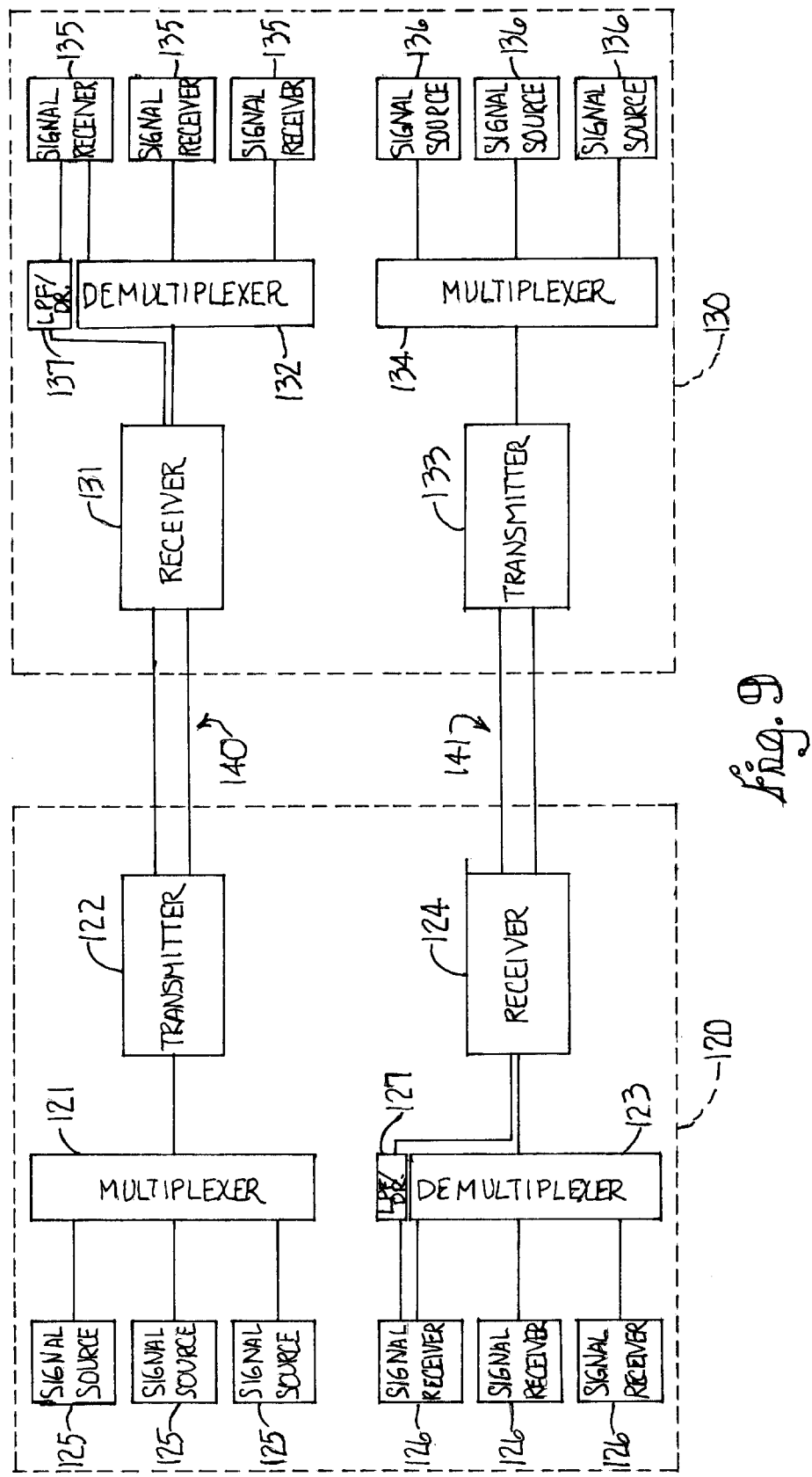
FIG. 9 is a block diagram of a variation of the communication system of FIG. 1.

FIG. 9 is a block diagram of such a system. A first station 120 is comprised of a plurality of signal sources 125, a multiplexer circuit 121, and a transmitter 122, as well as a receiver 124, a demultiplexer circuit 123, a lowpass filter/driver circuit 127, and a plurality of signal receivers 126. A second station 130 is comprised of a receiver 131, a demultiplexer circuit 132, a lowpass filter/driver circuit 137, and a plurality of signal receivers 135, as well as a plurality of signal sources 136, a multiplexer circuit 134, and a transmitter 133.

In addition, the communication system of FIG. 9 illustrates two stations 120 and 130 which are connected directly to each other by two pair of wire 140 and 141, typically telephone twisted pair. It is to be understood, however, that the system is equally applicable to stations connected in a nationwide telecommunication network.

Figure 10:
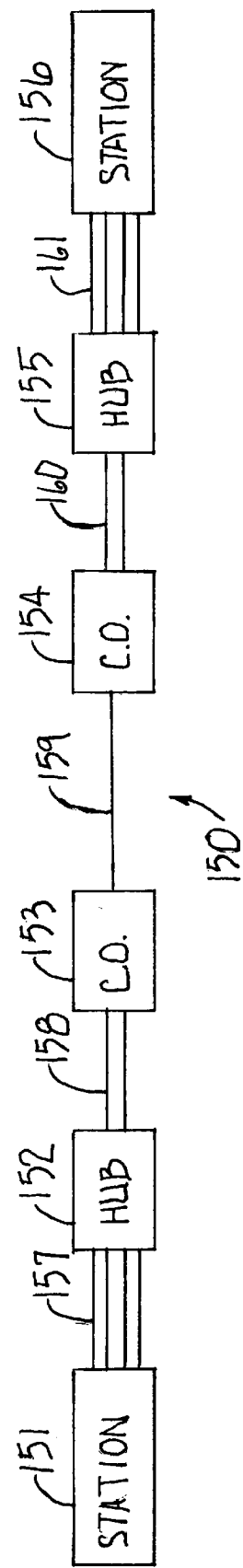
FIG. 10 is a block diagram of a variation of the communication system of FIG. 9.

FIG. 10 illustrates such a system. A first station 151, typically a home or business, is connected to a hub 152 by two pair of telephone wire 157. The hub 152 is centrally located so as to serve many homes or businesses. The hub 152 is connected to a telephone central office 153 by fiber optic cable 158. The central office 153 is connected to another telephone central office 154 by a nationwide telecommunication network which can include fiber optic cable, microwave, and satellites, indicated generally at 159. The central office 154 is connected to a hub 155 by fiber optic cable 160. The hub 155 is connected to a second station 156 by two pair of telephone wire 161.

Therefore, the preferred embodiments of the communication system of the invention provide for the transmission of non-compressed video, voice and data with little loss of signal between stations located on the same floor, in the same building, or in the same complex of buildings, as well as between stations located in different parts of the country.

Undoubtedly, numerous variations and modifications of the invention will become readily apparent to those familiar with communications systems. For example, the clarity of the signal at the signal receivers is dependent on the length of the wire pair link 50. Specifically, the signal to noise ratio is 62 dB and 48 dB at 3200 feet and 5000 feet respectively. The signal to noise ratio can easily be increased to 75 dB at 5000 feet by using a second non-feedback transconducting amplifier at the transmitter and a second pair of wire. Accordingly, the scope of the invention should not be construed as limited to the specific embodiment of the communication system depicted and described, but rather is defined in the claims appended hereto.

It is to be understood that while certain forms of the invention have been illustrated and described herein, it is not to be limited to the specific forms or arrangement of parts described as shown except as set forth in the following claims.

What is claimed and desired to be secured by Letters Patent is as follows:

1. A communication system for transmitting a base band signal over a wire link for extended distances comprising:

a) a transmitter having:

i) a circuit for amplifying said base band signal;

ii) a circuit having a differential transconducting non-feedback amplifier for converting said base band signal from common mode to differential mode; and
iii) a circuit for adding current whereby current drives said differential mode signal;
b) a wire link coupled to said transmitter for carrying said differential mode signal driven by said current, said wire link having a known impedance and capacitance; and
c) a receiver coupled to said wire link having:
i) at least one resistor and a capacitor for matching impedance of said wire link to correct said base band signal and for providing an offset impedance to said differential mode signal to compensate for said impedance of said wire link;
ii) at least one additional capacitor for providing an offset capacitance to said differential mode signal to compensate for said capacitance of said wire link;
iii) a circuit for suppressing noise in said differential mode signal; and
iv) a circuit for amplifying and refining said differential mode signal.

2. A communication system according to claim 1 wherein said receiver includes a circuit for removing said current from said differential mode signal.

3. A communication system according to claim 2 wherein said receiver includes a circuit for converting said differential mode signal to a common mode signal.

4. A communication system for transmitting a non-compressed video base band signal for extended distances over a wire link comprising:
a) a video base band signal source providing a video signal having an audio component and a video component;
b) a multiplexer adding said audio and base band video components of said base band video signal into a composite base band signal;
c) a transmitter having a circuit for amplifying substantially the entire frequency spectrum of said composite base band signal, a circuit having a differential transconducting non-feedback amplifier for converting said composite base band signal from common mode to differential mode, and a circuit for adding current to said differential composite signal whereby said current drives said differential composite base band signal;
d) a wire link carrying said differential composite signal driven by said current, said wire link having a known impedance and capacitance;
e) a receiver having at least one resistor and a capacitor for matching impedance of said wire link to correct said base band signal and providing an offset impedance and an offset capacitance to said differential composite signal to thereby compensate for said impedance and said capacitance of said wire link, converting said composite signal from differential mode to common mode, suppressing noise in said composite signal, removing said current from said composite signal, and amplifying and refining said composite base band signal;
f) a demultiplexer, lowpass filter and driver separating said composite base band signal into said audio and video components; and
g) a video signal receiver receiving said audio and video components.

5. A communication system according to claim 4 further comprising a plurality of voice base band signal sources for providing at least one telephone signal and at least one data base band signal, said multiplexer coupled to said voice base band signal sources, and to a video signal remaining in base band frequency from said transmitter, and a plurality of voice base band signal receivers coupled to said demultiplexer for receiving voice base band signals.

6. A communication system according to claim 5 further comprising a plurality of video base band signal sources, said multiplexer coupled to said video base band signal sources, and a plurality of video base band signal receivers coupled to said demultiplexer, a lowpass filter for separating said video base band signals from voice, audio and data base band signals and a driver for receiving video base band signals.

7. A communication system for transmitting a non-compressed base band signal over a wire pair for extended distances comprising:
a) at least one telephone signal source for providing at least one telephone signal, at least one data signal source for providing at least one data signal, and at least one video base band signal source for providing at least one video base band signal having a audio base band component and a video base band component;
b) a multiplexer coupled to said signal sources for mixing said telephone signal, said data signal, and said audio base band and video base band components of said video base band signal into a composite signal;
c) a base band transmitter coupled to said multiplexer having:
i) a circuit for amplifying substantially the entire frequency spectrum of said composite base band signal; and
ii) a circuit having a non-feedback transconducting amplifier for amplifying said composite signal and converting said composite base band signal from common mode to differential mode having a non-inverted component and an inverted component, adding a 90 degree current to said non-inverted component of said differential composite base band signal whereby said 90 degree current drives said non-inverted component, and adding a −90 degree current to said inverted component of said differential composite base band signal whereby said −90 degree current drives said inverted component;
d) a wire pair coupled to said transmitter and having a known impedance and capacitance, said wire pair having:
i) a first wire for carrying said non-inverted component of said differential composite signal base band driven by said 90 degree current; and
ii) a second wire for carrying said inverted component of said differential composite base band signal driven by said −90 degree current;
e) a receiver coupled to said wire pair having:
i) a circuit having a at least one resistor for providing an offset impedance to said differential composite base band signal to thereby compensate for said impedance of said wire pair and at least one capacitor for providing an offset capacitance to said differential composite base band signal to thereby compensate for said capacitance of said wire pair;
ii) a circuit having a non-feedback transconducting amplifier for converting said composite base band signal from differential mode to common mode, removing said −90 degree current from said composite signal, and amplifying said composite base band signal;

iii) a circuit for suppressing noise in said composite base band signal and removing said 90 degree current from said composite base band signal; and iv) a circuit having a first stage for amplifying and refining the negative component of said composite base band signal, a second stage for amplifying and refining the positive component of said composite base band signal, and a third stage for further amplifying and refining the negative component of said composite base band signal;

f) a demultiplexer, lowpass filter and driver coupled to aid receiver for separating said composite base band signal into said telephone signal, said data signal and said audio and video base band components of said video signal; and g) at least one telephone signal receiver, at least one data signal receiver, and at least one video base band signal receiver, coupled to said demultiplexer, lowpass filter and driver for receiving said telephone signal, said data signal, and said audio and video base band components of said video signal;

h) whereby said video base band signal remains in base band.

8. A base band receiver coupled to a wire pair for receiving a differential base band signal having a non-inverted component driven by a 90 degree current and an inverted component driven by a -90 degree current, said receiver comprising:

a) a circuit having at least one resistor for providing an offset impedance to said differential base band signal to thereby compensate for the impedance of said wire pair and at least one capacitor for providing an offset capacitance to said differential base band signal to thereby compensate for the capacitance of said wire pair;

b) a circuit having a non-feedback transconducting amplifier for amplifying said differential base band signal, converting said base band signal from differential mode to common mode, and removing said -90 degree current from said base band signal;

c) a circuit for suppressing noise in said base band signal and removing said 90 degree current from said base band signal; and d) a circuit having a first stage for amplifying and refining the negative component of said base band signal, a second stage for amplifying and refining the positive component of said base band signal, and a third stage for further amplifying and refining the negative component of said base band signal.

9. A method for transmitting a base band signal over a wire link for extended distances comprising the steps of:

a) amplifying substantially the entire frequency spectrum of said base band signal;

b) converting said base band signal from common mode to differential mode by processing said base band signal through a differential transconducting non-feedback amplifier;

c) adding current to said differential mode signal such that said current drives said differential mode signal;

d) transmitting said differential mode signal driven by said current over said wire link;

e) correcting said differential mode signal for degradation caused by said wire link by using impedance matching a capacitance matching;

f) amplifying said differential mode signal;

g) suppressing noise in said differential mode signal; and h) refining and amplifying said differential mode signal.

10. A method for transmitting a base band signal over a wire link for extended distances according to claim 9 wherein said step of suppressing noise in said differential mode signal includes removing said current from said signal.

11. A method for transmitting a signal over a wire link for extended distances according to claim 10 wherein said step of amplifying said differential mode signal includes converting said signal from differential mode to common mode.

12. A method for transmitting a non-compressed video base band signal over a wire pair for extended distances comprising the steps of:

a) mixing the audio and video base band components of said video signal to form a composite base band signal;

b) amplifying substantially the entire frequency spectrum of said composite base band signal;

c) amplifying said composite base band signal by a differential transconducting non-feedback amplifier to convert said composite base band signal from common mode to differential mode having a non-inverted component and an inverted component;

d) adding a 90 degree current to said non-inverted component whereby said 90 degree current drives said non-inverted component, and adding a -90 degree current to said inverted component whereby said -90 degree current drives said component;

e) transmitting said non-inverted component driven by said 90 degree current and said inverted component driven by said -90 degree current over said wire pair;

f) providing an offset impedance and an offset capacitance to said differential composite base band signal to compensate for the impedance and capacitance of said wire pair;

g) amplifying said differential composite base band signal, converting said composite base band signal from differential mode to common mode, and removing said -90 degree current from said composite base band signal;

h) suppressing noise in said composite base band signal and removing said 90 degree current from said composite base band signal;

i) amplifying and refining said composite base band signal;

and j) separating said composite base band signal into said audio and video base band components.

13. A method for the simultaneous transmission of at least one video base band signal, at least one telephone base band signal, and at least one data base band signal over a wire pair for extended distances comprising the steps of:

a) mixing said telephone signal, said data signal, and the audio and video components of said video signal to form a composite base band signal;

b) amplifying substantially the entire frequency spectrum of said composite base band signal;

c) amplifying said composite base band signal by a differential transconducting non-feedback amplifier to convert said composite base band signal from common mode to differential mode having a non-inverted component and an inverted component;

d) adding a 90 degree current to said non-inverted component of said differential composite base band signal whereby said 90 degree current drives said non-inverted component, and adding a −90 degree current to said inverted component of said differential composite base band signal whereby said −90 degree current drives said inverted component;

e) transmitting said non-inverted component of said differential composite base band signal driven by said 90 degree current over a first wire, and said inverted component of said differential composite base band signal driven by said −90 degree current over a second wire;

f) correcting said differential composite signal by using impedance matching and capacitance matching to compensate for the impedance and capacitance of said first wire and said second wire;

g) amplifying said differential composite base band signal, converting said composite base band signal from differential mode to common mode, and removing said −90 degree current from said composite base band signal;

h) suppressing noise in said composite base band signal and removing said 90 degree current from said composite base band signal;

i) amplifying and refining said composite base band signal using sin x/x correction; and j) separating said composite base band signal into said telephone signal, said data signal, and said audio and video base band components of said video signal.

* * * * *